United States Patent

Heimann, Jr. et al.

[11] Patent Number: 5,771,852
[45] Date of Patent: Jun. 30, 1998

[54] POPPET VALVE WITH EMBOSSED NECK STRUCTURE

[75] Inventors: Rudy J. Heimann, Jr., Brunswick; Victor D. Levin, Highland Hts.; William Neumann, Lakewood; Joseph L. Palko, Strongsville; Robert E. Southam, Hudson, all of Ohio

[73] Assignee: TRW Inc., Lyndhurst, Ohio

[21] Appl. No.: 811,334

[22] Filed: Mar. 4, 1997

[51] Int. Cl.⁶ ............................................ F01L 3/20
[52] U.S. Cl. ............................. 123/188.3; 123/188.7; 123/188.11
[58] Field of Search ........................ 123/188.3, 188.7, 123/188.11; 251/321

[56] References Cited

U.S. PATENT DOCUMENTS

| | | |
|---|---|---|
| 2,218,983 | 10/1940 | Daisley . |
| 2,221,657 | 11/1940 | Taylor . |
| 2,367,783 | 1/1945 | Kerwin et al. . |
| 2,411,764 | 11/1946 | Thoren et al. . |
| 2,450,817 | 10/1948 | Sterling . |
| 3,090,370 | 5/1963 | Kimball ............................ 123/188.7 |
| 4,137,886 | 2/1979 | Hiramatsu ........................ 123/188.7 |
| 5,099,808 | 3/1992 | Matsuura et al. ................. 123/188.3 |
| 5,413,073 | 5/1995 | Larson et al. . |
| 5,458,314 | 10/1995 | Bonesteel . |
| 5,485,815 | 1/1996 | Shida ............................... 123/188.3 |

FOREIGN PATENT DOCUMENTS 2 115 486  9/1983  United Kingdom ............... 123/188.3

*Primary Examiner*—Erick R. Solis
*Attorney, Agent, or Firm*—Tarolli, Sundheim, Covell, Tummino & Szabo

[57] ABSTRACT

A poppet valve (10) has a disk-shaped head (12), an elongated stem (16), and a tapered neck (24) between the head (12) and the stem (16). The neck (24) has an outer surface (32) with an undulating circumferential contour. The undulating circumferential contour improves component strength and heat transfer efficiency, and may also influence valve rotation and inlet charge swirl.

2 Claims, 1 Drawing Sheet

POPPET VALVE WITH EMBOSSED NECK STRUCTURE

FIELD OF THE INVENTION

The present invention relates to a poppet valve for use in an internal combustion engine.

BACKGROUND OF THE INVENTION

A poppet valve for use in an internal combustion engine has a disk-shaped head mounted on a shank. The shank has an elongated cylindrical stem portion, and has a tapered neck portion upon which the head is mounted. A rim surface of the head defines the valve seat.

SUMMARY OF THE INVENTION

In accordance with the present invention, a poppet valve has a disk-shaped head, an elongated stem and a tapered neck between the head and the stem. The neck has an outer surface with an undulating circumferential contour.

In the preferred embodiments of the present invention, the undulating circumferential contour at the neck is defined by an embossed hollow wall portion of the valve. In the first embodiment, the undulating circumferential contour is defined by a plurality of grooves at the outer surface of the neck. In a second embodiment, the undulating circumferential contour is defined by a plurality of ribs at the outer surface of the neck. In each case, the undulating circumferential contour improves component strength and heat transfer efficiency. The undulating circumferential contour may also influence valve rotation and inlet charge swirl.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figures 1, 2, 3:
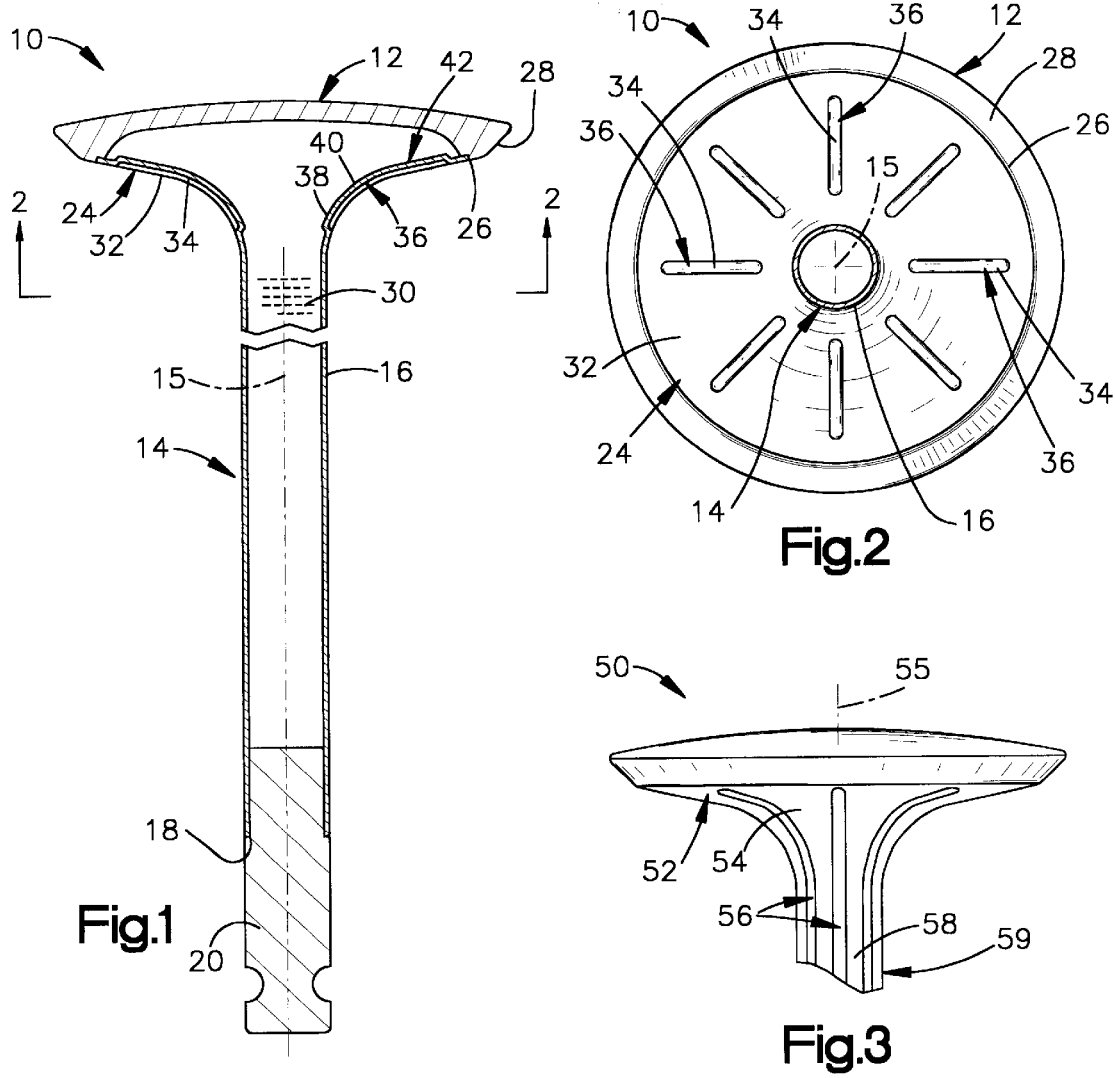
FIG. 1 is a view of a poppet valve comprising a first embodiment of the present invention.
FIG. 2 is a view taken on line 2—2 of FIG. 1.
FIG. 3 is a partial view of a poppet valve comprising a second embodiment of the present invention.

A poppet valve 10 comprising a preferred embodiment of the present invention is shown in FIG. 1. The poppet valve 10 has a solid, disk-shaped metal head 12 and a hollow, elongated metal shank 14 centered on a longitudinal axis 15. A stem portion 16 of the shank 14 is closed at its lower end 18 by a cylindrical plug 20. The plug 20 is fixed to the stem 16 by a weld (not shown) in any suitable manner known in the art. A neck portion 24 of the shank 14 has a generally conical shape with an arcuate profile tapered radially outward from the stem 16 to the head 12. A circumferentially extending weld 26 fixes the head 12 to the shank 14 at the periphery of the neck 24. A rim surface 28 of the head 12 defines the valve seat. As shown schematically in FIG. 1, an optional coolant 30 is contained with in the hollow shank 14.

The neck 24 has an outer surface 32. A plurality of recessed portions 34 of the outer surface 32 define a corresponding plurality of grooves 36 which are spaced apart circumferentially about the axis 15. In the first embodiment of the present invention, each groove 36 has a radially extending linear configuration. The outer surface 32 of the neck 24 thus has an undulating contour extending circumferentially around the axis 15.

As further shown in FIG. 1, the neck 24 is constructed as an embossed hollow wall portion of the valve 10. The neck 24 thus has an inner surface 38 with an undulating circumferential contour complementary to that of the outer surface 32. Accordingly, the inner surface 38 has a plurality of raised portions 40 defining radially extending ribs 42 at the locations of the grooves 36 in the outer surface 32.

The undulating contours defined by the grooves 36 and ribs 42 strengthen the hollow wall structure of the neck 24. Added strength also results from the cold working of the metal material upon formation of the grooves 36 and ribs 42. Moreover, the embossed configuration of the neck 24 increases the area of the inner surface 38 in contact with the enclosed coolant 30. This increases the efficiency of heat transfer and is especially beneficial when the poppet valve 10 is used as an exhaust valve.

A poppet valve 50 comprising a second embodiment of the present invention is shown partially in FIG. 3. Like the valve 10 described above, the valve 50 has a tapered neck 52 constructed as an embossed hollow portion of the valve 50. The neck 52 has outer surface 54 with an undulating circumferential contour defined by a plurality of circumferentially spaced, radially extending grooves 56. However, unlike the grooves 36 at the neck 24 of the valve 10 (FIGS. 1 and 2), the grooves 56 at the neck 52 of the valve 50 extend longitudinally downward, as viewed in FIG. 3, onto the stem portion 58 of the corresponding shank 59.

Figures 4, 5:
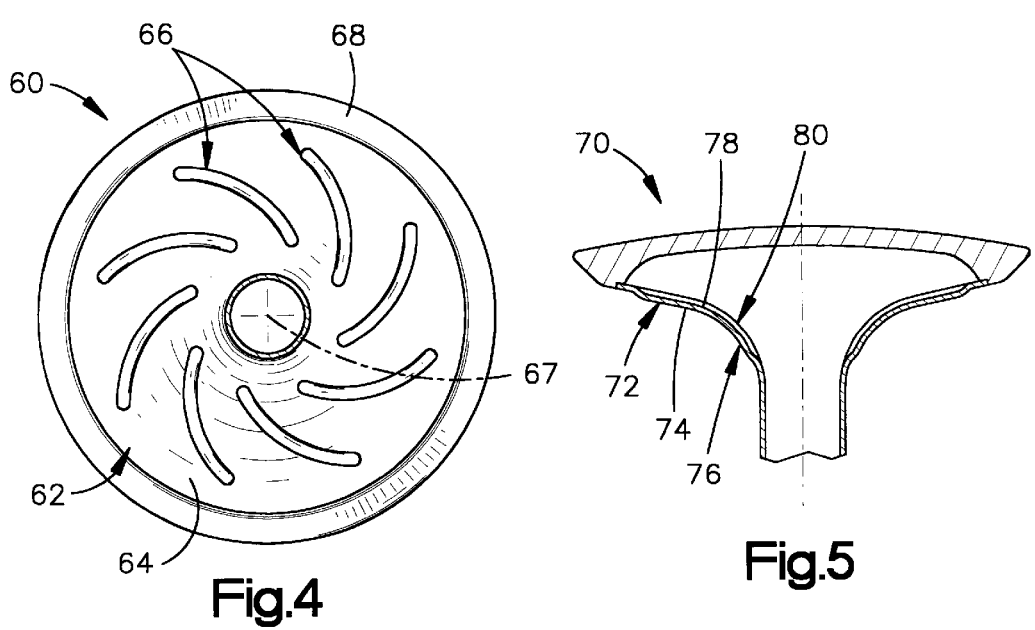
FIG. 4 is a partial view of a poppet valve comprising a third embodiment of the present invention.
FIG. 5 is a partial view of a poppet valve comprising a fourth embodiment of the present invention.

A poppet valve 60 comprising a third embodiment of the present invention is shown partially in FIG. 4. The valve 60 has a tapered neck 62 which, like the necks 24 and 52 described above, is constructed as an embossed hollow wall portion of the valve 60. The neck 62 thus has an outer surface 64 with an undulating circumferential contour defined by a plurality of circumferentially spaced grooves 66. However, the grooves 66 have helical rather than radially linear configurations. This feature of the present invention enables the valve 60 to induce a swirl in an inlet charge impinging upon the outer surface 64 of the neck 62. Such a swirl can increase combustion efficiency. This feature of the present invention also imparts a turbine-like configuration to the valve 60, and thus promotes rotation of the valve 60 about its longitudinal central axis 67. Such rotation of the valve 60 can reduce wear by causing the valve seat 68 to mate with an opposed seating surface in circumferentially shifted orientations when the valve 60 closes.

A poppet valve 70 comprising a fourth embodiment of the present invention is shown partially in FIG. 5. Like each of the valves 10, 50 and 60 described above, the valve 70 has a tapered neck 72 constructed as an embossed hollow wall portion of the valve 70. However, the undulating circumferential contour of the neck 72 is radially reversed relative to the contours of the necks 24, 52 and 62 of the valves 10, 50 and 60. The neck 72 of the valve 70 thus has a plurality of raised outer surface portions 74 defining circumferentially spaced ribs 76. The neck 72 further has a corresponding plurality of recessed inner surface portions 78 defining grooves 80 at the circumferentially spaced locations of the ribs 76. Additionally, as compared with the embossed structure of the neck 24 shown in FIG. 1, the embossed structure of the neck 72 has a more arcuate radial profile at the opposite ends of the ribs 76 and grooves 80. This structural feature can vary in differing embodiments of the invention.

From the above description of the invention, those skilled in the art will perceive improvements, changes and modifications. For example, each of the preferred embodiments of the present invention has eight circumferentially spaced grooves or ribs at the outer surface of the tapered neck. A single groove or rib, a different number of circumferentially spaced grooves or ribs, or circumferentially alternating grooves and ribs could be used as alternative structures in accordance with the present invention. In another modification of the present invention, helical grooves like the grooves 66 of FIG. 4, as well as linear ribs like the ribs 76 of FIG. 5, could be extended longitudinally onto the stem of the corresponding shank. Such improvements, changes and modifications within the skill of the art are intended to be covered by the appended claims.

Having described the invention, the following is claimed:

1. A poppet valve having a disk-shaped head, an elongated stem, and a tapered neck between said head and said stem, said neck having a ribbed outer surface, said neck being defined by an embossed hollow wall portion of said valve having a grooved inner surface with a contour complementary to the contour of said ribbed outer surface.

2. A poppet valve having a disk-shaped head, an elongated stem, and a tapered neck between said head and said stem, said neck having a grooved outer surface, said neck being defined by an embossed hollow wall portion of said valve having a ribbed inner surface with a contour complementary to the contour of said grooved outer surface.

\* \* \* \* \*